(12) United States Patent
Classon et al.

(10) Patent No.: US 10,555,271 B2
(45) Date of Patent: Feb. 4, 2020

(54) SYSTEM AND METHOD FOR SIGNALING A PROHIBITED D2D OPERATION

(71) Applicant: Futurewei Technologies, Inc., Plano, TX (US)

(72) Inventors: Brian Classon, Palatine, IL (US); Philippe Sartori, Plainfield, IL (US)

(73) Assignee: Futurewei Technologies, Inc., Plano, TX (US)

( * ) Notice: Subject to any disclaimer, the term of this patent is extended or adjusted under 35 U.S.C. 154(b) by 13 days.

(21) Appl. No.: 14/937,525

(22) Filed: Nov. 10, 2015

(65) Prior Publication Data

US 2016/0142991 A1    May 19, 2016

Related U.S. Application Data

(60) Provisional application No. 62/079,454, filed on Nov. 13, 2014.

(51) Int. Cl.
*H04W 56/00* (2009.01)
*H04W 72/04* (2009.01)

(52) U.S. Cl.
CPC ....... *H04W 56/001* (2013.01); *H04W 72/042* (2013.01)

(58) Field of Classification Search
CPC . H04W 56/001; H04W 48/00; H04W 72/042; H04W 92/18; H04W 76/14
See application file for complete search history.

(56) References Cited

U.S. PATENT DOCUMENTS

| | | | | |
|---|---|---|---|---|
| 8,619,658 B2* | 12/2013 | Sammour | ............. | H04J 3/0605 370/312 |
| 9,226,268 B2* | 12/2015 | Koo | ...................... | H04W 72/04 |
| 9,414,268 B2* | 8/2016 | Fodor | ................... | H04W 36/08 |
| 9,820,111 B2* | 11/2017 | Morita | .................. | H04W 72/10 |

(Continued)

FOREIGN PATENT DOCUMENTS

| | | |
|---|---|---|
| CN | 102388666 A | 3/2012 |
| CN | 102792745 A | 11/2012 |
| WO | 2012082024 A1 | 6/2012 |

OTHER PUBLICATIONS

3GPP TR 36.843 V12.0.1, 3rd Generation Partnership Project; Technical Specification Group Radio Access Network; Study on LTE Device to Device Proximity Services; Radio Aspects (Release 12), Mar. 2014, pp. 1-50.

(Continued)

*Primary Examiner* — Khaled M Kassim
*Assistant Examiner* — Thomas R Cairns
(74) *Attorney, Agent, or Firm* — Slater Matsil, LLP

(57) ABSTRACT

An embodiment method for operating a base station includes instructing, by the base station, a mobile device to transmit, over grouped communications resources, a first instance of a data structure for D2D signaling. The data structure includes a first data field that indicates at least one of a D2D frame number, a D2D multiplexing configuration, a resource allocation for D2D signaling, an identifier of a D2D synchronization source, a type of a D2D synchronization source, or whether the mobile device is in coverage of a network. The data structure also includes a second data field indicating at least one of whether a D2D signaling operation is prohibited, or a type of prohibited D2D signaling operation.

29 Claims, 10 Drawing Sheets

(56) References Cited

U.S. PATENT DOCUMENTS

| | | |
|---|---|---|
| 2012/0051315 A1 | 3/2012 | Wang et al. |
| 2012/0243431 A1 | 9/2012 | Chen et al. |
| 2016/0066317 A1* | 3/2016 | Chae .................. H04J 1/02 370/336 |
| 2016/0374135 A1* | 12/2016 | Martin .................. H04W 72/04 |
| 2017/0034688 A1* | 2/2017 | Kim .................. H04W 4/02 |

OTHER PUBLICATIONS

3GPP TS 36.211 V12.7.0, 3rd Generation Partnership Project; Technical Specification Group Radio Access Network; Evolved Universal Terrestrial Radio Access (E-UTRA); Physical channels and modulation (Release 12), Sep. 2015, pp. 1-136.

Synchronization Signals (PSS and SSS)—MATLAB & Simulink, http://www.mathworks.com/help/lte/ug/synchronization-signals-pss-and-sss.html, downloaded Oct. 7, 2015, pp. 1-5.

\* cited by examiner

SYSTEM AND METHOD FOR SIGNALING A PROHIBITED D2D OPERATION

This application claims the benefit of U.S. Provisional Application No. 62/079,454, filed on Nov. 13, 2014, which application is hereby incorporated herein by reference.

TECHNICAL FIELD

The present invention relates generally to a system and method for device-to-device (D2D) signaling, and, in particular embodiments, to a system and method for signaling a prohibited D2D operation.

BACKGROUND

Cellular networks that use a variety of base stations (BSs) and mobile devices are constantly evolving to incorporate new technologies with improved features and functionality for delivering higher data rates, quality of service, and cost efficiencies. D2D communications are one such technology that promises to offer new services, improve system throughput, and provide a better user experience for future cellular networks.

SUMMARY

In accordance with a first example embodiment of the present invention, a method for operating a base station is provided. The method includes instructing, by the base station, a mobile device to transmit, over grouped communications resources, a first instance of a data structure for Device-to-Device (D2D) signaling. The data structure includes a first data field that indicates at least one of a D2D frame number, a D2D multiplexing configuration, a resource allocation for D2D signaling, an identifier of a D2D synchronization source, a type of a D2D synchronization source, or whether the mobile device is in coverage of a network. The data structure also includes a second data field indicating at least one of whether a D2D signaling operation is prohibited, or a type of prohibited D2D signaling operation.

In accordance with a second example embodiment of the present invention, a method for operating a mobile device is provided. The method includes transmitting, by the mobile device over grouped communications resources, a first instance of a data structure for D2D signaling. The data structure includes a first data field that indicates at least one of a D2D frame number, a D2D multiplexing configuration, a resource allocation for D2D signaling, an identifier of a D2D synchronization source, a type of a D2D synchronization source, or whether the mobile device is in coverage of a network. The data structure also includes a second data field indicating at least one of whether a D2D signaling operation is prohibited, or a type of prohibited D2D signaling operation.

In accordance with a third example embodiment of the present invention, a base station is provided. The base station includes a processor and a non-transitory computer readable storage medium coupled to the processor and storing programming for execution by the processor. The programming includes instructions for directing a mobile device to transmit, over grouped communications resources, a first instance of a data structure for D2D signaling. The data structure includes a first data field that indicates at least one of a D2D frame number, a D2D multiplexing configuration, a resource allocation for D2D signaling, an identifier of a D2D synchronization source, a type of a D2D synchronization source, or whether the mobile device is in coverage of a network. The data structure also includes a second data field indicating at least one of whether a D2D signaling operation is prohibited, or a type of prohibited D2D signaling operation.

In accordance with a fourth example embodiment of the present invention, a mobile device is provided. The mobile device includes a processor and a non-transitory computer readable storage medium coupled to the processor and storing programming for execution by the processor. The programming includes instructions for transmitting over grouped communications resources, a first instance of a data structure for D2D signaling. The data structure indicates at least one of a D2D frame number, a D2D multiplexing configuration, a resource allocation for D2D signaling, an identifier of a D2D synchronization source, a type of a D2D synchronization source, or whether the mobile device is in coverage of a network. The programming also includes instructions for receiving a second instance of the data structure. The programming also includes instructions for adapting a configuration of the mobile device to prevent the prohibited D2D operation when the second instance of the data structure indicates that a D2D operation is prohibited for a class of prohibited devices that includes the mobile device.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

In various embodiments, a wireless network supports D2D communications, which are direct communications between two mobile devices. The network also supports other operations such as, e.g., uplink transmissions from mobile device(s) to a base station, downlink transmissions from a base station to mobile device(s), etc. Frequency resources, time resource, Single-Carrier Frequency Division Multiple Access (SC-FDMA) resource blocks, or other communications resources may be shared by the D2D communications and one or more of these other network operations. A first mobile device transmitting D2D messages may interfere with the other network operations when the first mobile device is out of coverage or in partial coverage of the network. The first mobile device suppresses any interference that it may cause by acting in accordance with a D2D Frequency Off (DFO) field. This DFO field is transmitted by one or more second mobile device(s) over communications resources used for operational information and/or synchronization training data for D2D signaling. Such D2D interference-suppressing transmissions may be performed by the second mobile device(s) with or without instruction from a base station.

Figure 1:
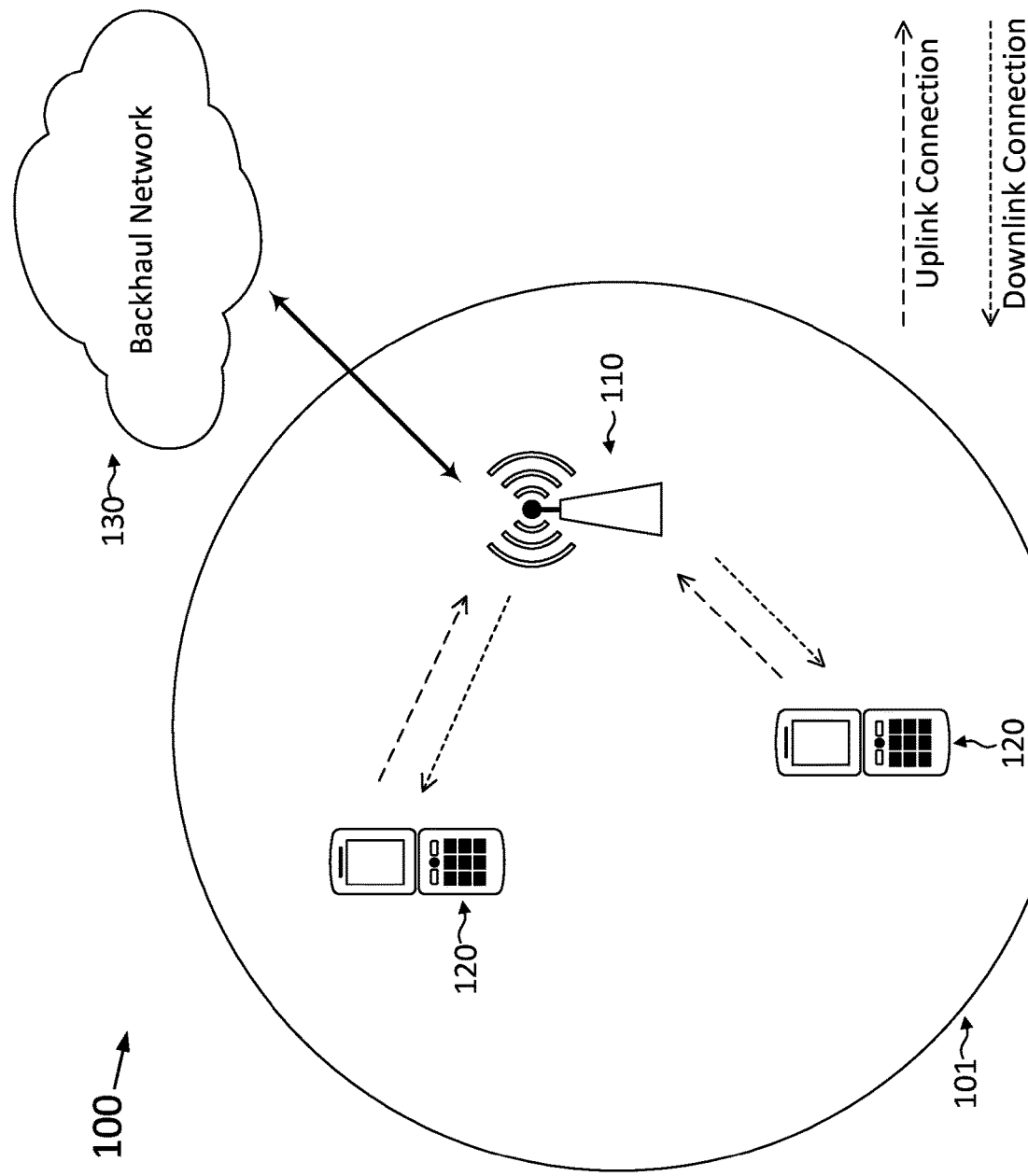
FIG. 1 is a block diagram illustrating a wireless communications network, in accordance with embodiments of the present invention.

FIG. 1 illustrates a network 100 for communicating data. The network 100 comprises a base station 110 having a coverage area 101, a plurality of mobile devices 120, and a backhaul network 130. As shown, the base station 110 establishes uplink (dashed line) and/or downlink (dotted line) connections with the mobile devices 120, which serve to carry data from the mobile devices 120 to the base station 110 and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, such as an enhanced base station (eNB), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc. As used herein, the term "mobile device" refers to any component (or collection of components) capable of establishing a wireless connection with a base station, such as a user equipment (UE), a mobile station (STA), and other wirelessly enabled devices. In some embodiments, the network 100 may comprise various other wireless devices, such as relays, low power nodes, etc.

Figure 2A:
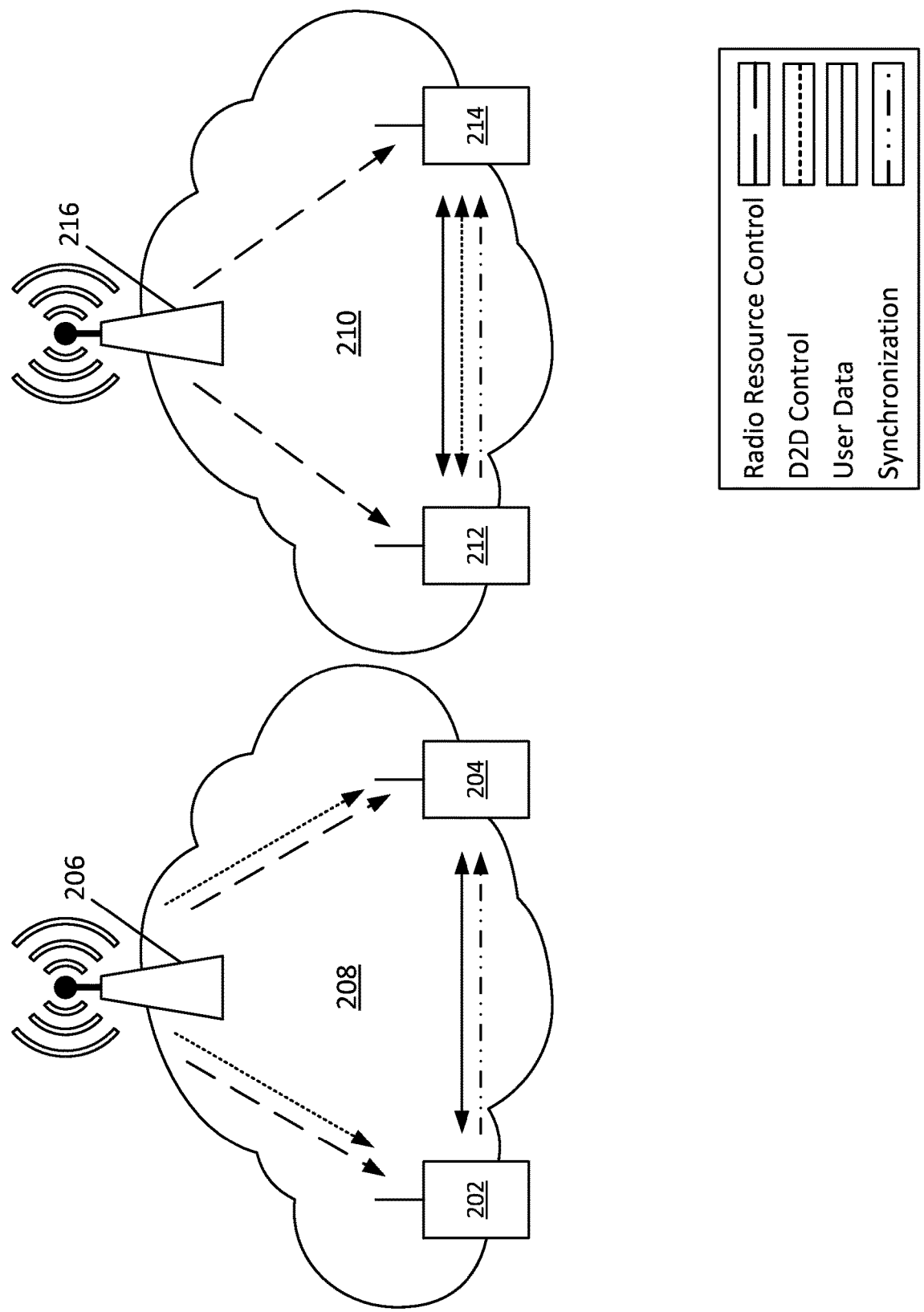
FIG. 2A is a block diagram illustrating networks supporting D2D communications, in accordance with embodiments of the present invention.

FIG. 2A shows embodiment networks 208 and 210 supporting D2D communications. A D2D link, also referred to as a Proximity Service (ProSe) link or a sidelink, is a direct communication between two mobile devices, such as between a first set of mobile devices 202 and 204 of network 208, or between a second set of mobile devices 212 and 214 of network 210. The radio bearer for direct communication between mobile devices 202 and 204 does not transit through a BS 206 of network 208, and the radio bearer for direct communication between mobile devices 212 and 214 does not transit through a BS 216 of network 210. Both BS 206 and BS 216, however, respectively provide Radio Resource Control (RRC) signals to the first set of mobile devices 202 and 204 and to the second set of mobile devices 212 and 214. These RRC signals may include, e.g., uplink/downlink connection establishment and release signals, broadcast of system information, uplink/downlink radio bearer establishment/reconfiguration/release signals, connection mobility procedures, paging notification/release signals, outer loop power control signals, etc.

Furthermore, in network 208, BS 206 provides D2D control signals to mobile devices 202 and/or 204, including control signals for directing D2D discovery of other mobile device(s), control signals for directing transmission of synchronization signals by one or more of mobile devices 202 and 204, and/or D2D resource allocation control signals. These D2D resource allocation control signals are for directing an allocation of communications resources (e.g., sub-carrier frequency ranges, transmit time intervals, etc.) for D2D communications including, for example, an allocation of resources for transmissions of user data between mobile device 202 and mobile device 204. Resource allocation directed by the BS 206 ensures that interference is not caused by collisions of data that is transmitted from multiple devices over shared communications resources. The D2D control signals are provided over a downlink control channel such as, e.g., a Physical Downlink Control Channel (PDCCH), an Enhanced PDCCH (EPDCCH), etc.

As compared to network 208, D2D operations in network 210 are performed with less support from BS 116 (as can be seen from the fewer number of arrows in the figure). For example, in network 210 one or both of mobile devices 212 and 214 autonomously selects resources from shared resource pools to transmit user data and/or D2D control information directly to each other. Mobile devices 212 and 214 may also autonomously perform D2D discovery of other D2D-capable mobile device(s).

In an embodiment, networks 208 and/or 210 are configured such that, at regular or intermittent intervals, mobile devices 202 and 212 transmit a synchronization training signal, referred to as a D2D Synchronization Symbol (D2DSS), that is accompanied by an informational signal transmitted in a group of communications resources referred to as a Physical D2D Synchronization Channel (PD2DSCH). In general, a D2DSS is transmitted from a mobile device that is a D2D synchronization source to one or more other mobile devices. For example, in the embodiment of FIG. 2A mobile device 202 is a synchronization source of mobile device 204, and mobile device 212 is a synchronization source of mobile device 214. A D2DSS is a known signal from which receiving mobile devices 204 and 214 can obtain timing and frequency synchronization for D2D communications by comparing a stored version of the D2DSS to a version of the D2DSS received over the air. The D2DSS may include, e.g., a Zadoff Chu sequence, which is a synchronization signal that has zero correlation when there is any lag between the stored sequence and the received sequence. Alternatively or in addition, the D2DSS may also include a maximum length sequence (i.e., an m-sequence) which is a pseudorandom binary sequence of length m that can be created by cycling through every possible state of an m-length shift register.

A PD2DSCH, which is also referred to as a Physical Sidelink Broadcast Channel (PSBCH), is a group of communications resources over which instances of a data structure may be transmitted that provide information needed for proper D2D signaling. Each PD2DSCH instance is transmitted by a D2D synchronization source, such as mobile devices 202 and 212, to provide D2D operational information that accompanies transmission of the D2DSS by the synchronization source. The PD2DSCH data structure includes fields indicating, e.g., D2D frame number (DFN), identity and/or type of the D2D synchronization source(s), resource allocation for D2D data and/or control signaling, etc. The PD2DSCH data structure also may include a multiplexing configuration field that indicates, e.g., whether Time Division Duplex (TDD) or Frequency Division Duplex (FDD) operation is to be used, what configuration of TDD is to be used, etc. In some embodiments, D2D resource allocation and multiplexing configuration are indicated by the same field of the PD2DSCH data structure.

Figure 2B:
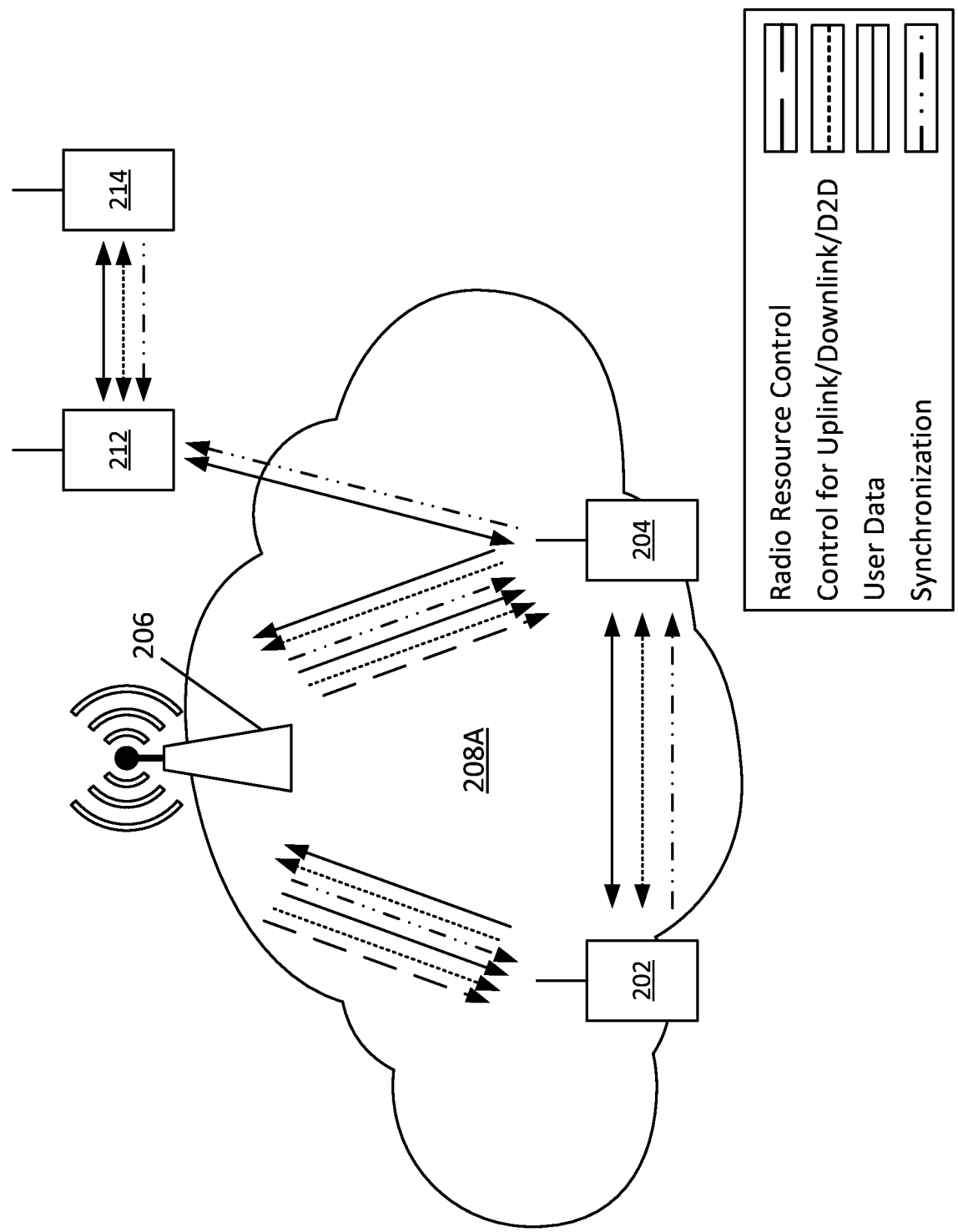
FIG. 2B is a block diagram illustrating a network that includes signaling in various data links, in accordance with embodiments of the present invention.

FIG. 2B shows embodiment links between devices in network 208A, including uplink user data and control links from mobile devices 202 and 204 to BS 206, downlink user data, control, and synchronization links from BS 206 to mobile devices 202 and 204, and RRC links from BS 206 to mobile devices 202 and 204. The network 208A also includes signaling in D2D user data and control links (including the D2DSS and PD2DSCH signaling) between mobile devices 202 and 204. In an embodiment, the signaling in all of the links of network 208A are transmitted using one or more symbols that are multiplexed across time division and frequency division resources, including, e.g., Single-Carrier Frequency Division Multiple Access (SC-FDMA) symbol(s) transmitted in one or more assigned time slots.

Referring again to FIG. 2B, a mobile device is considered to be in-coverage for a network if it can receive a signal (e.g., a D2D signal) from at least one BS operating on the network, and thus mobile devices 202 and 204 are considered to be in-coverage for network 208A since they can receive signals from BS 206 operating on network 208A. A mobile device is considered in partial coverage for a network if it cannot receive a signal from any BS operating on the network but it can receive a signal (e.g., a D2D signal) from at least one mobile device that is in coverage of the network. Mobile device 212 is therefore in partial coverage for network 208A since it cannot receive a signal from BS 206 or any other BS of network 208A, but it can receive D2D user data and synchronization information from mobile device 204. A mobile device is considered out-of-coverage for a network if it cannot receive a signal from any BS operating on the network and it cannot receive a signal from any mobile device that is in coverage of the network. Thus, mobile device 214 is out of coverage for network 208A since it cannot receive a signal from BS 206 or any other BS of network 208A, and since it cannot receive a signal from in-coverage mobile devices 202 or 204 or any other mobile devices in coverage for network 208A.

In an embodiment, D2D communications share the same resources that are used for other network operations such that, without coordinated allocation of resources, D2D communications may interfere with these other network operations. For example, D2D communications may share resources with uplink user data and/or control links to BS 206 from mobile devices 202 and 204. Relative to sharing downlink resources, D2D communications that share uplink resources have reduced impact on the ability of networked mobile devices 202 and 204 to receive synchronization signaling and control signaling such as, e.g., a PDCCH/EPDCCH signal or other downlink control signal from BS 206. Even if uplink resources are shared, however, in certain situations a mobile device may perform D2D communications that interfere with the user data and/or control uplinks to BS 206 from networked mobile devices 202 and 204. For example, mobile device 214 which is out of coverage of network 208A may be geographically near to BS 206 and may have a D2D link or may attempt to form a D2D link with an in-partial-coverage device (e.g., mobile device 212) or with another out-of-coverage device, but may have a resource allocation that is not properly coordinated with that of the uplink(s) to BS 206. Additionally, in some embodiments an in-partial coverage mobile device 212 may be geographically near to BS 206 and may have or may attempt to form a D2D link with an out-of-coverage device (e.g., mobile device 214), with an in coverage device (e.g., mobile devices 202 and 204), or with another in-partial-coverage mobile device, but may have a resource allocation that is not properly coordinated with that of the uplink(s) to BS 206.

Figure 3:
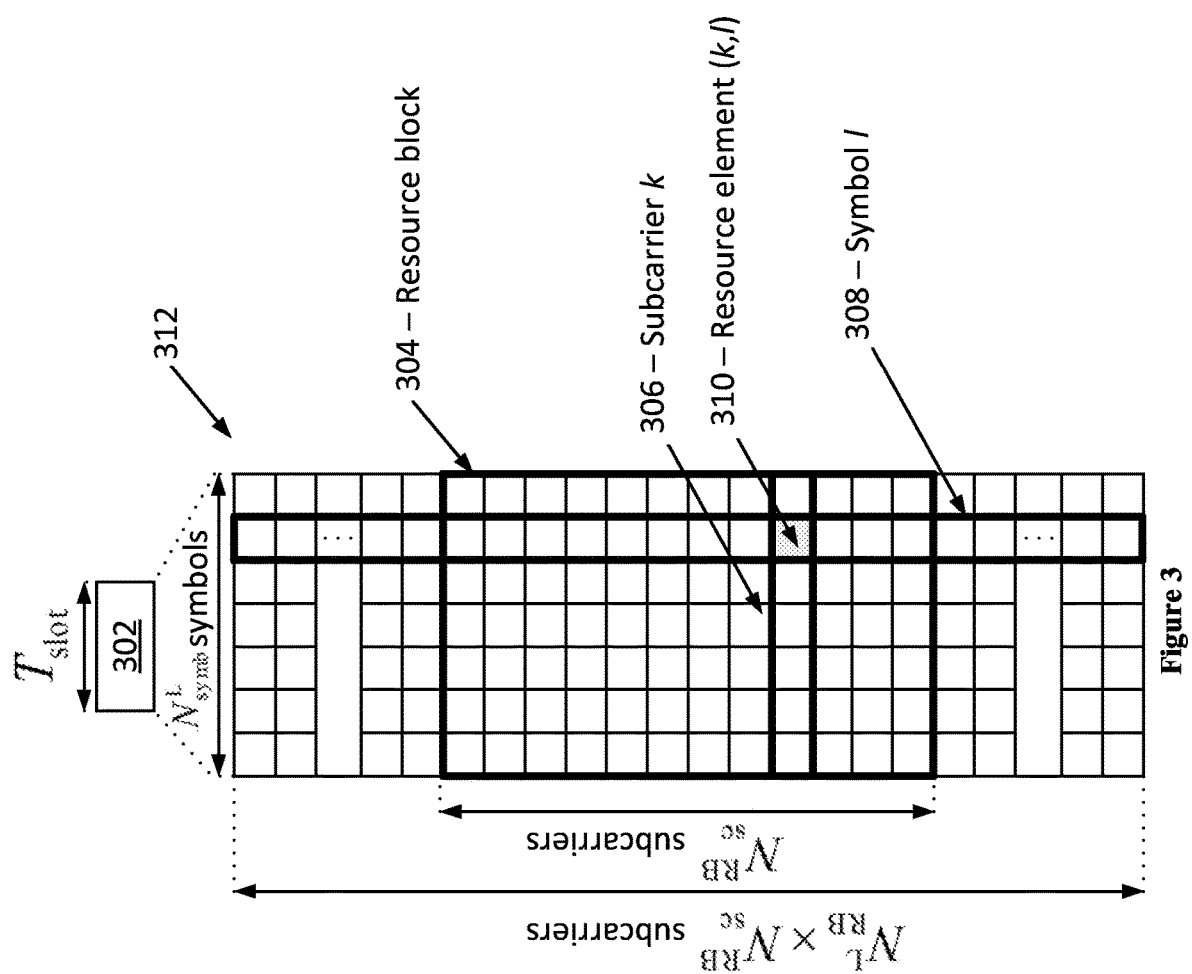
FIG. 3 is a block diagram illustrating a resource-multiplexing time slot that may be used in various data links, in accordance with embodiments of the present invention.

FIG. 3 illustrates an embodiment SC-FDMA resource-multiplexing time slot 302 that may be used in the D2D link, downlink, and/or uplink transmissions of FIG. 2B. During the time slot 302, which has a duration $T_{slot}$, data over a link L (e.g., an uplink, downlink, D2D link, etc.) is assigned in frequency over a number $N_{RB}^L$ of resource blocks 304 that each consist of $N_{SC}^{RB}$ subcarriers 306. The data in time slot 302 over link L is also assigned in time over $N_{symb}^L$ SC-FDMA symbols 308. Thus, the data over link L is assigned in each time slot 302 to resource elements 310 of a resource grid 312 of $N_{RB}^L \times N_{SC}^{RB}$ subcarriers 306 and $N_{symb}^L$ SC-FDMA symbols 308, as shown in FIG. 3. Resource elements 310 are the individual elements in the resource grid 312 and are uniquely defined by the index pair (k, l) in a slot where k=0, . . . , $N_{RB}^L \cdot N_{SC}^{RB}-1$ and l=0, . . . , $N_{symb}$—1 are the subcarrier/frequency index and symbol/time index, respectively.

In an embodiment, there is only one such resource grid 312 for each time slot 302 per link per antenna port, and resource element (k, l) on antenna port p contains a complex value $a_{k,l}^{(p)}$. In an embodiment, the D2DSS and PD2DSCH signals share an overlapping set of SC-FDMA subcarriers transmitted from the same antenna port. In an embodiment, multiple time slots having the same resource structure as time slot 302 are organized into successively larger structures including radio subframes, radio frames consisting of multiple subframes, etc. In some embodiments, all elements of a radio subframe may be jointly scrambled as a single block, i.e., altered as a single block of bits by performing an exclusive-OR with a pseudo-random bit sequence, and then modulated by, e.g., BPSK modulation, m-QAM modulation, etc. For example, all the bits of a PD2DSCH transmission may be assigned to the same radio subframe and scrambled as a block using a device-specific scrambling sequence prior to being QPSK modulated. In some embodiments, all resource elements of a radio subframe may be coded together using the same channel coding such as, e.g., a channel-specific Forward-Error Correction (FEC) code, a channel-specific Walsh code or other orthogonal multiple access code, a channel-specific Direct Sequence Spread Spectrum (DSSS) code, etc.

Figure 4:
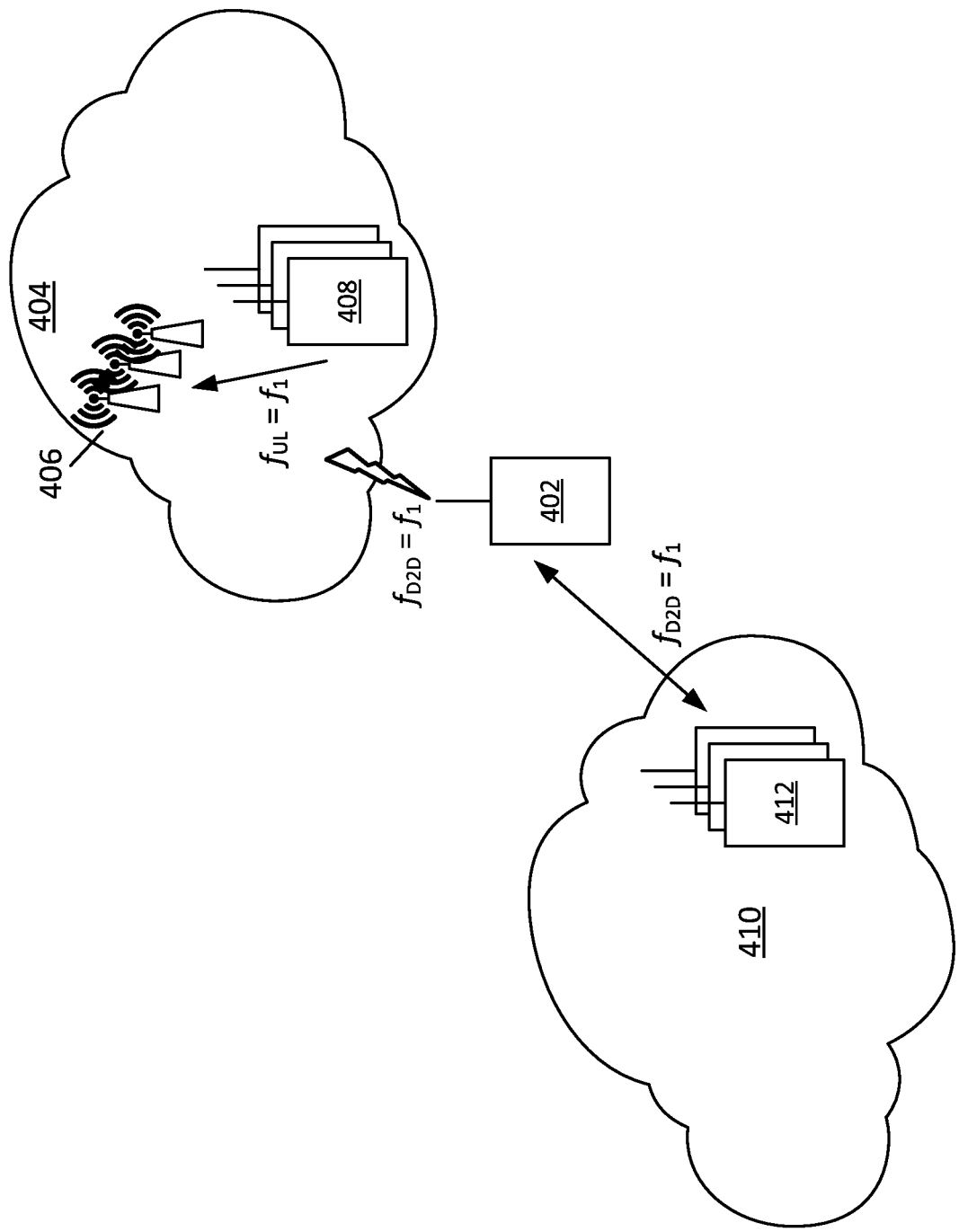
FIG. 4 is a block diagram illustrating an out-of-coverage mobile device interfering with a network, in accordance with embodiments of the present invention.

FIG. 4 shows an example embodiment of an out-of-coverage mobile device 402 interfering with a frequency-division multiplexing network 404. Mobile device 402 is considered out-of-coverage for network 404 because it cannot receive a signal from any BS 406 operating on network 404 and it cannot receive a signal from any of mobile device(s) 408 that are in coverage of network 404.

In the embodiment of FIG. 4, Network 404 uses subcarrier frequency $f_1$ as an uplink frequency range $f_{UL}$. Mobile device 402 is (pre-)configured to use subcarrier frequency $f_1$ as a D2D communication frequency range $f_{D2D}$ for communicating with UEs 412 on network 410, and thus mobile device 402 uses $f_{D2D}=f_1$ for D2D communications regardless of whether it is out of coverage or in coverage of Network 404. Furthermore, mobile device 402 is close to at least one of BS(s) 406 but is out of coverage of Network 404, resulting in interference with an uplink of Network 404. In other example embodiments, interference is caused by improper coordination of resources other than frequency, including, e.g. time division resources, SC-FDMA resource blocks, channel codes, etc.

In the example embodiment of FIG. 4, Network 404 and Network 410 do not overlap. In other embodiments, different network configurations may cause a mobile device near a particular Network "A" to be out-of-coverage, such as when, for example, Network A and a Network "B" partially overlap (e.g., at the border of two countries), Network A and Network B are operated by the same operator (e.g., AT&T Philadelphia and AT&T New York) but the D2D operation/configuration is different for both areas, or Network A is an FDD network and Network B is a TDD network or vice-versa. To help suppress such interference, the data structure of the PD2DSCH includes a D2D Frequency Off (DFO) field of one or more bits to help suppress D2D operations when interference or potential interference is detected. In some embodiments, the PD2DSCH also has a coverage indication field of one or more bits indicating whether the transmitting mobile device of the PD2DSCH is an in-coverage mobile device or an out-of-coverage mobile device for any network. In some embodiments, the coverage indication field indicates whether the mobile device is in coverage of a particular network.

In an embodiment, the data of the DFO field and/or coverage indication field is transmitted with data of one or more of the other PD2DSCH fields (e.g., D2D resource allocation, identity/type of the D2D synchronization source(s), DFN, multiplexing configuration, etc.) over the same group of communications resources. This same group of communications resources may be, e.g., the same time interval, the same frequency range, adjacent time intervals, adjacent frequency ranges, the same channel coding, the same block for pseudo-random scrambling, the same SC-FDMA resource block, etc.

Figure 5:
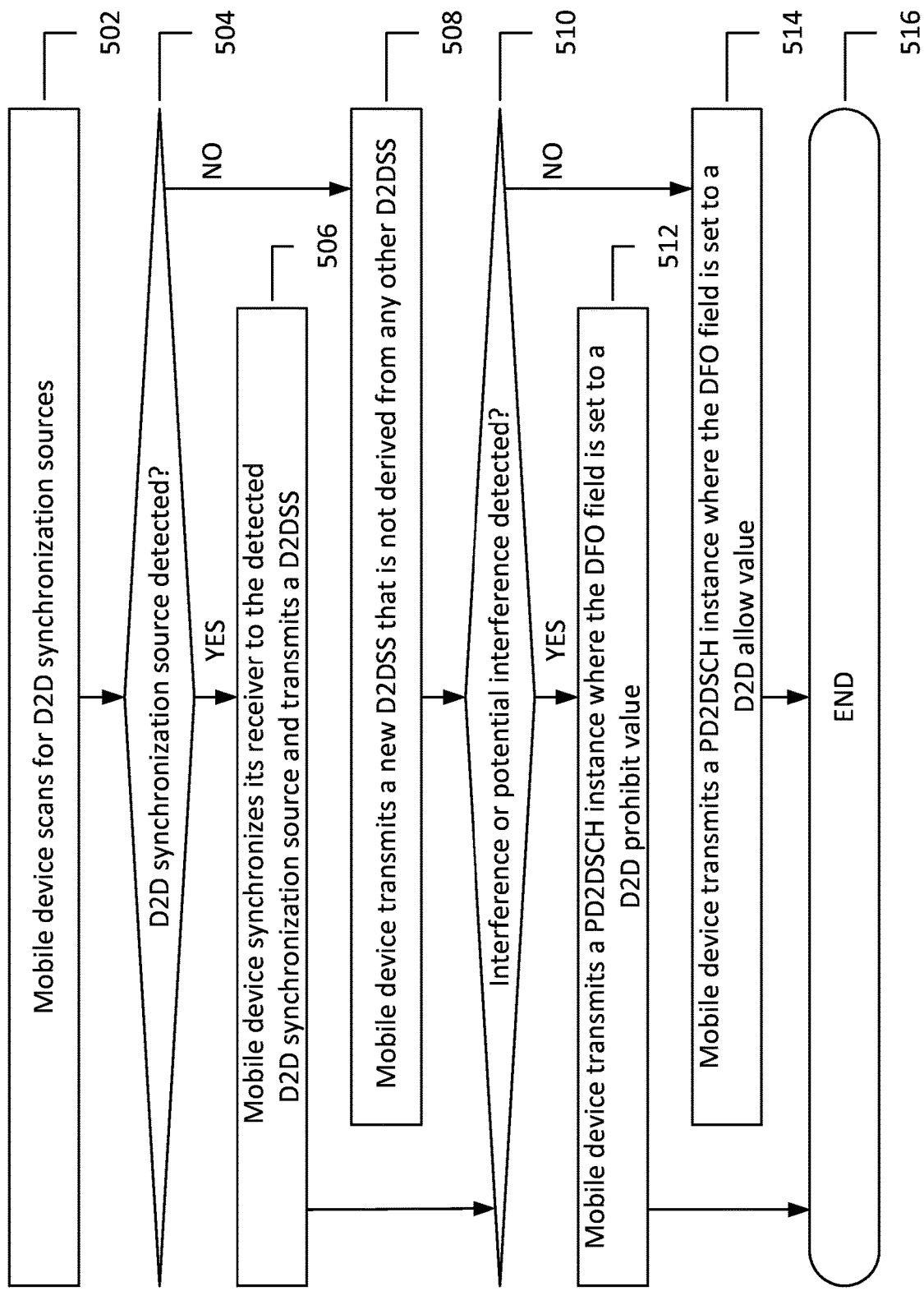
FIG. 5 is a flow diagram illustrating a method for signaling during a D2D synchronization sequence, in accordance with embodiments of the present invention.

FIG. 5 shows an embodiment method for signaling during a D2D synchronization sequence. At step 502, before starting to transmit a D2DSS, a mobile device scans for D2D synchronization sources. At step 504, if a D2D synchronization source is detected, flow continues at step 506. Otherwise, flow continues at step 508.

At step 506, the mobile device synchronizes its receiver to the detected D2D synchronization source before transmitting a D2DSS that may be, e.g., a D2DSS derived from a D2DSS received from the D2D synchronization source. In some embodiments, a mobile device may later reselect the D2D synchronization source it uses as the timing reference for its transmissions of D2DSS if the mobile device detects a change in the D2D synchronization source.

At step 508, since no D2D synchronization source is detected, the mobile device transmits a new D2DSS that is not derived from any other D2DSS. At step 510, if interference or potential interference by D2D operations on other network operations has been detected, flow continues at step 512. Otherwise, flow continues at step 514. At step 512, the mobile device transmits a PD2DSCH where the DFO field is set to a "D2D prohibit value" indicating that a set of D2D operations are prohibited. The method ends at step 516.

At step 514, since no interference or potential interference has been detected, the mobile device transmits a PD2DSCH instance with the DFO field instantiated with a "D2D allow value" indicating that all D2D operations are allowed by all mobile devices, whether in coverage or out of coverage. The method ends at step 516.

In an embodiment, the DFO field only has one bit, indicating either a D2D allow value (e.g., a value of "1") or a D2D "prohibit all" value (e.g., a value of "0") indicating that all D2D operations other than transmitting the D2DSS and the PD2DSCH are prohibited. In an alternative embodiment, the DFO field is larger than one bit and conveys more information, indicating that only some D2D operations are prohibited, or that operations are prohibited for only certain network devices or network users. Such prohibited operations indicated by the DFO field may include, for example, that: (1) D2D communication with an out-of-coverage mobile device is prohibited only when settings are configured for autonomous resource allocation by one or both of the D2D mobile devices instead of by a BS; (2) D2D communication is prohibited between any mobile devices, whether in-coverage or out-of-coverage, when D2D resources are allocated autonomously by a mobile device instead of by a BS; or (3) only D2D discovery and transmitting the D2DSS and the PD2DSCH is allowed, but all other D2D communications are prohibited. In various embodiments, D2D prohibit values may also include any combination of the foregoing prohibitions applied selectively to, e.g., users that are not emergency services users and/or government users, mobile devices that are associated with prohibited operator(s) (e.g., not associated with preferred operator(s)), other selected classes of network users or devices, etc.

In an embodiment, when interference or potential interference has been detected, mobile device(s) within coverage of network B transmit a D2DSS and its accompanying PD2DSCH, where the latter is a "DFO-only PD2DSCH," meaning that only the DFO field of the PD2DSCH is set to a meaningful value, and the other fields are either uninitialized or are set to values indicating they should be ignored by a receiving mobile device. In an alternative embodiment, the PD2SCH has meaningful information in both the DFO field and in some or all of the other fields when interference or potential interference has been detected. For example, if the coverage indication field indicated that the transmitting mobile device is out of coverage, the DFO field may be ignored by the receiving mobile device.

Figure 6A:
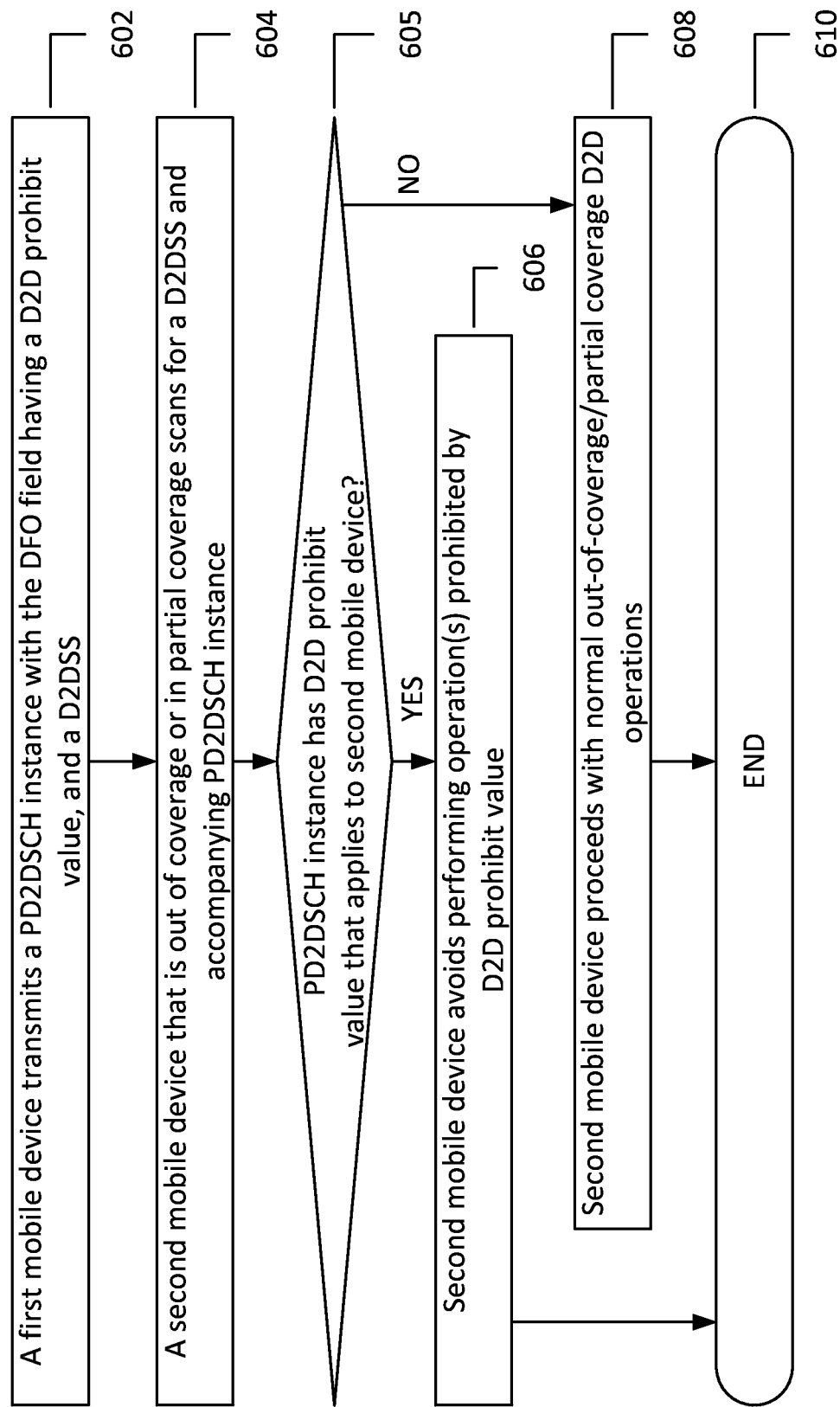
FIG. 6A is a flow diagram illustrating a method for using a D2D Frequency Off (DFO) field to suppress interference in a D2D network, in accordance with embodiments of the present invention.

FIG. 6A shows an embodiment method for using a DFO field to suppress interference in a D2D network. At step 602, a first mobile device transmits a PD2DSCH with the DFO field having a D2D prohibit value, along with a D2DSS. In some embodiments, the D2D prohibit value may be a value specified by a BS. In other embodiments, the D2D prohibit value is generated autonomously by the first mobile device after it detected an attempted D2D operation by a mobile device that is a member of a prohibited class such as, e.g., an out-of-coverage mobile device, a mobile device associated with a prohibited operator, etc.

Referring again to FIG. 6A, at step 604 a second D2D-capable mobile device that is out of coverage or in partial coverage scans for a D2DSS and the accompanying PD2DSCH instance. The second mobile device may perform the scan before performing a D2D operation and/or after D2D operation has started. At step 605, if the DFO field of the PD2DSCH instance is received with a D2D prohibit value that applies to the second mobile device (e.g., the value prohibits a set of D2D operations by non-emergency users, and the second mobile device is a non-emergency user), flow continues at step 606. Otherwise, flow continues at step 608.

At step 606, the second mobile device configures itself to avoid performing the set of operation(s) prohibited by the D2D prohibit value, and the method then ends at step 610. In an embodiment, after receiving a "D2D-prohibit transmission," i.e., a transmission of D2DSS and the PD2DSCH where the latter has a D2D prohibit value in the DFO field, a receiving mobile device begins to transmit its own D2D-prohibit transmission that may use either the same D2D prohibit value or a different D2D prohibit value. For example, the receiving mobile device may receive a D2D prohibit value indicating that a set of D2D operations are prohibited for a class of mobile devices (e.g., devices not associated with preferred operator(s)), but the receiving mobile device may transmit a D2D "prohibit all" value instead of this class-based D2D prohibit value.

Referring again to FIG. 6A, at step 608, when a D2D prohibit value has not been received, the mobile device proceeds with normal out-of-coverage/partial coverage D2D operations. The method ends at step 610.

Figure 6B:
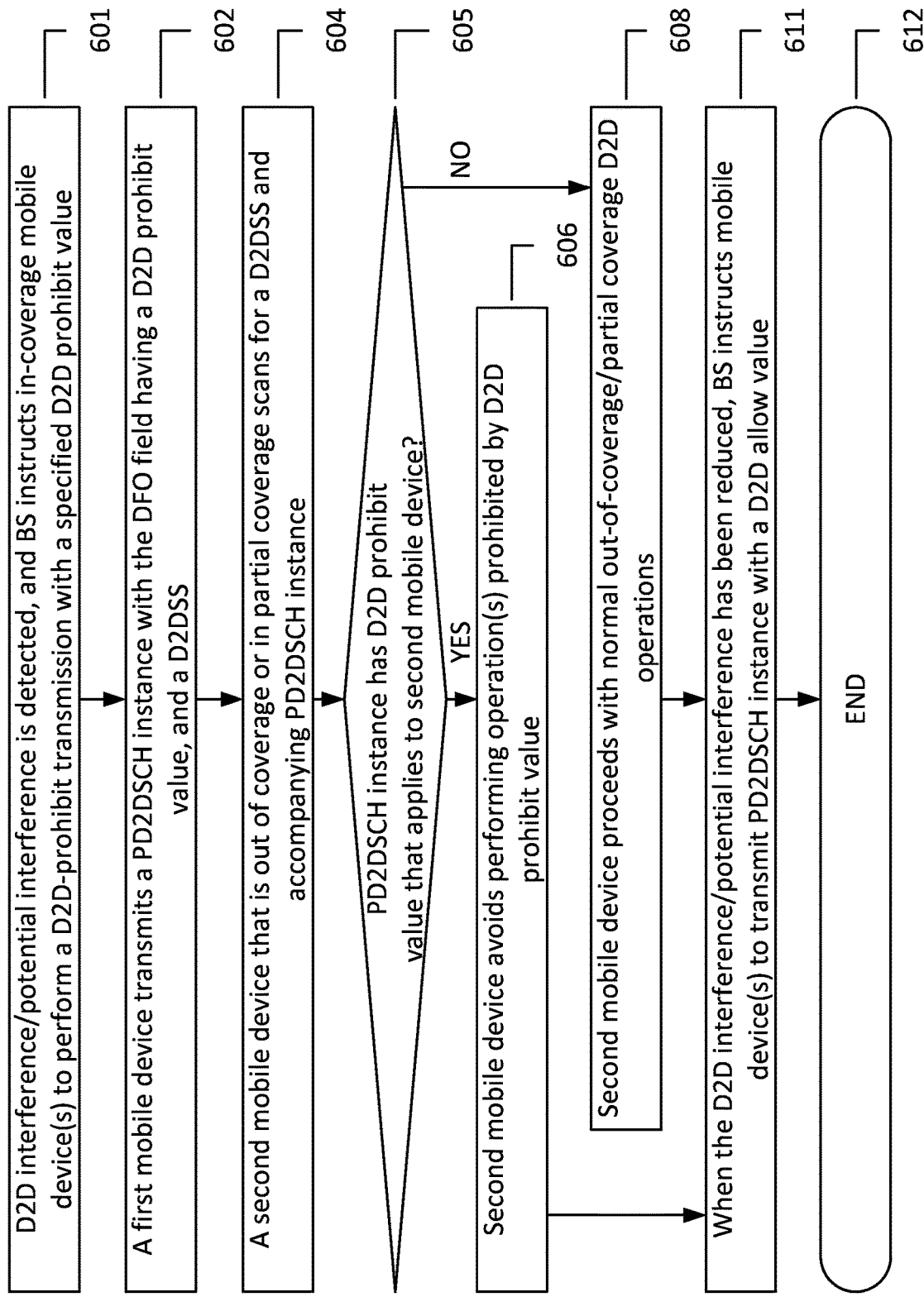
FIG. 6B is a flow diagram illustrating a method for using a DFO field with base station support to suppress interference in a D2D network, in accordance with embodiments of the present invention.

FIG. 6B shows an alternative embodiment of the method of FIG. 6A, where D2D interference suppression is performed with BS support. The only differences from the embodiment of FIG. 6A is that an additional step 601 has been included prior to step 602, and step 610 has been replaced by steps 611 and 612 in the embodiment of FIG. 6B. At step 601, network interference or potential network interference by D2D operation(s) is detected, causing a BS to instruct one or more in-coverage mobile devices to perform a D2D-prohibit transmission with a specified D2D prohibit value. In an embodiment, this D2D-prohibit instruction from the BS may be triggered by a report of D2D interference or potential D2D interference from a mobile device to the BS. In an embodiment, the mobile device may generate this report after it detects an attempted D2D operation by a mobile device that is a member of a class of prohibited mobile devices.

Referring again to FIG. 6B, at step 611, at a later time when the D2D interference or potential for D2D interference has been reduced, the BS instructs one or more mobile devices to transmit a PD2DSCH with a D2D allow value in the DFO field. The method ends at step 612.

Figure 7:
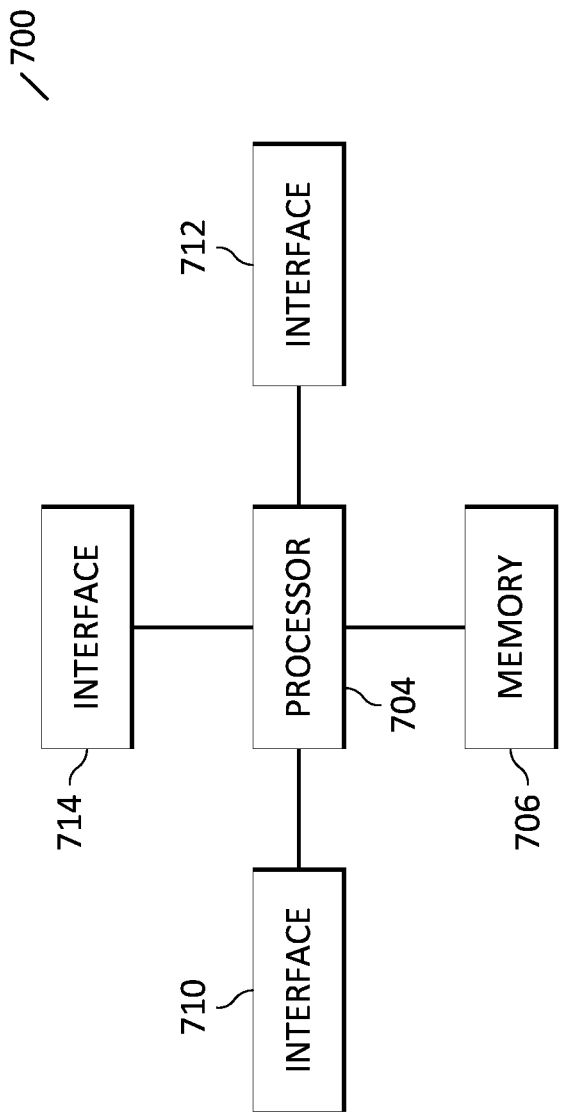
FIG. 7 illustrates a block diagram of a processing system for performing methods described herein, which may be installed in a host device, in accordance with embodiments of the present invention.

FIG. 7 illustrates a block diagram of an embodiment processing system 700 for performing methods described herein, which may be installed in a host device. As shown, the processing system 700 includes a processor 704, a memory 706, and interfaces 710-714, which may (or may not) be arranged as shown in FIG. 7. The processor 704 may be any component or collection of components adapted to perform computations and/or other processing related tasks, and the memory 706 may be any component or collection of components adapted to store programming and/or instructions for execution by the processor 704. In an embodiment, the memory 706 includes a non-transitory computer readable medium. The interfaces 710, 712, 714 may be any component or collection of components that allow the processing system 700 to communicate with other devices/components and/or a user. For example, one or more of the interfaces 710, 712, 714 may be adapted to communicate data, control, or management messages from the processor 704 to applications installed on the host device and/or a remote device. As another example, one or more of the interfaces 710, 712, 714 may be adapted to allow a user or user device (e.g., Personal Computer (PC), etc.) to interact/communicate with the processing system 700. The processing system 700 may include additional components not depicted in FIG. 7, such as long term storage (e.g., non-volatile memory, etc.).

In some embodiments, the processing system 700 is included in a network device that is accessing, or part otherwise of, a telecommunications network. In one example, the processing system 700 is in a network-side device in a wireless or wireline telecommunications network, such as a base station, a relay station, a scheduler, a controller, a gateway, a router, an applications server, or any other device in the telecommunications network. In other embodiments, the processing system 700 is in a user-side device accessing a wireless or wireline telecommunications network, such as a mobile station, a UE, a PC, a tablet, a wearable communications device (e.g., a smartwatch, etc.), or any other device adapted to access a telecommunications network. In some embodiments, one or more of the interfaces 710, 712, 714 connects the processing system 700 to a transceiver adapted to transmit and receive signaling over the telecommunications network.

In an embodiment where the processing system 700 is included in a base station, the memory 706 stores programming for execution by the processor 704 and the programming includes instructions for directing a mobile device to transmit, over grouped communications resources, a first instance of a data structure for D2D signaling. The data structure includes a first data field that indicates at least one of a D2D frame number, a D2D multiplexing configuration, a resource allocation for D2D signaling, an identifier of a D2D synchronization source, a type of a D2D synchronization source, or whether the mobile device is in coverage of a network. The data structure also includes a second data field indicating at least one of whether a D2D signaling operation is prohibited, or a type of prohibited D2D signaling operation.

In an embodiment where the processing system 700 is included in a mobile device, the memory 706 stores programming for execution by the processor 704 and the programming includes instructions for transmitting, over grouped communications resources via one or more of interfaces 710, 712, or 714, a first instance of a data structure for D2D signaling. The data structure indicates at least one of a D2D frame number, a D2D multiplexing configuration, a resource allocation for D2D signaling, an identifier of a D2D synchronization source, a type of a D2D synchronization source, or whether the mobile device is in coverage of a network. The programming also includes instructions for receiving, via one or more of interfaces 710, 712, or 714, a second instance of the data structure. The programming also includes instructions for adapting a configuration of the mobile device to prevent the prohibited D2D operation when the second instance of the data structure indicates that a D2D operation is prohibited for a class of prohibited devices that includes the mobile device.

Figure 8:
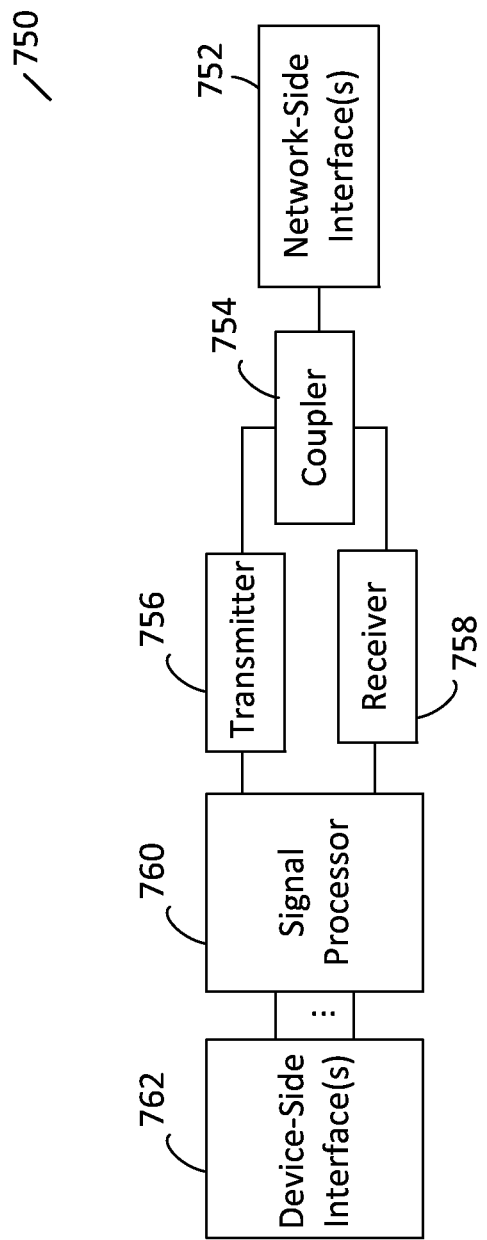
FIG. 8 illustrates a block diagram of a transceiver adapted to transmit and receive signaling over a telecommunications network, in accordance with embodiments of the present invention.

FIG. 8 illustrates a block diagram of a transceiver 750 adapted to transmit and receive signaling over a telecommunications network. The transceiver 750 may be installed in a host device. As shown, the transceiver 750 comprises a network-side interface 752, a coupler 754, a transmitter 756, a receiver 758, a signal processor 760, and a device-side interface 762. The network-side interface 752 may include any component or collection of components adapted to transmit or receive signaling over a wireless or wireline telecommunications network. The coupler 754 may include any component or collection of components adapted to facilitate bi-directional communication over the network-side interface 752. The transmitter 756 may include any component or collection of components (e.g., up-converter, power amplifier, etc.) adapted to convert a baseband signal into a modulated carrier signal suitable for transmission over the network-side interface 752. The receiver 758 may include any component or collection of components (e.g., down-converter, low noise amplifier, etc.) adapted to convert a carrier signal received over the network-side interface 752 into a baseband signal. The signal processor 760 may include any component or collection of components adapted to convert a baseband signal into a data signal suitable for communication over the device-side interface(s) 762, or vice-versa. The device-side interface(s) 762 may include any component or collection of components adapted to communicate data-signals between the signal processor 760 and components within the host device (e.g., the processing system 700, Local Area Network (LAN) ports, etc.).

The transceiver 750 may transmit and receive signaling over any type of communications medium. In some embodiments, the transceiver 750 transmits and receives signaling over a wireless medium. For example, the transceiver 750 may be a wireless transceiver adapted to communicate in accordance with a wireless telecommunications protocol, such as a cellular protocol (e.g., Long-Term Evolution (LTE), etc.), a Wireless Local Area Network (WLAN) protocol (e.g., Wi-Fi, etc.), or any other type of wireless protocol (e.g., Bluetooth, Near Field Communication (NFC), etc.). In such embodiments, the network-side interface 752 comprises one or more antenna/radiating elements. For example, the network-side interface 752 may include a single antenna, multiple separate antennas, or a multi-antenna array configured for multi-layer communication, e.g., Single Input Multiple Output (SIMO), Multiple Input Single Output (MISO), Multiple Input Multiple Output (MIMO), etc. In other embodiments, the transceiver 750 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Illustrative embodiments of the present invention have the advantage of reducing impact on network operations of interference from D2D operations between wireless mobile devices. An embodiment system uses DFO signaling that is more robust at preventing interference than geographic-based suppression of interfering D2D operations.

The following additional example embodiments of the present invention are also provided. In accordance with a first example embodiment of the present invention, a method for operating a base station is provided. The method includes instructing, by the base station, a mobile device to transmit, over grouped communications resources, a first instance of a data structure for Device-to-Device (D2D) signaling. The data structure includes a first data field that indicates at least one of a D2D frame number, a D2D multiplexing configuration, a resource allocation for D2D signaling, an identifier of a D2D synchronization source, a type of a D2D synchronization source, or whether the mobile device is in coverage of a network. The data structure also includes a second data field indicating at least one of whether a D2D signaling operation is prohibited, or a type of prohibited D2D signaling operation.

Also, the foregoing first example embodiment may be implemented to include one or more of the following additional features. The method may also be implemented such that the grouped communications resources include at least one of a same time interval, a same frequency range, adjacent time intervals, adjacent frequency ranges, a same channel coding, a portion of a same resource block for Single-Carrier Frequency Division Multiple Access (SC-FDMA), or a portion of a same block for pseudo-random scrambling.

The method may also be implemented such that the first instance of the data structure includes an instance of the first data field that contains either uninitialized data, or data indicating that the instance of the first data field should be ignored. In such an implementation, the first instance of the data structure may also include an instance of the second data field indicating the type of prohibited D2D signaling operation, and the type of prohibited D2D signaling operation may include at least one of D2D transmissions of user data, D2D discovery operations, a D2D signaling operation using resources that are allocated by a mobile device, a D2D signaling operation by a class of prohibited mobile devices, or a D2D signaling operation by a class of prohibited mobile device users.

The method may also be implemented such that the type of prohibited D2D signaling operation includes the D2D signaling operation by the class of prohibited mobile devices, and the class of prohibited mobile devices includes at least one of mobile devices that are associated with a prohibited operator, or out-of-coverage mobile devices. The method may also be implemented such that the type of prohibited D2D signaling operation includes the D2D signaling operation by the class of prohibited mobile device users, and the class of prohibited mobile device users includes at least one of non-emergency users or non-governmental users.

The method may also be implemented to further include receiving, by the base station, a report that includes either network interference by a D2D signaling operation or potential network interference by a D2D signaling operation. In such an implementation, the first instance of the data structure may indicate that a D2D signaling operation is prohibited, and the instructing the mobile device to transmit the first instance of the data structure for D2D signaling may include transmitting, by the base station over a downlink control channel, a message that includes an instruction for the mobile device to transmit the first instance of the data structure for D2D signaling. In such an implementation, the message may also include an instruction for the mobile device to transmit a synchronization training signal that is associated with the first instance of the data structure.

The method may also be implemented such that the synchronization training signal includes at least one of a Zadoff-Chu sequence or a maximum length sequence, and the grouped communications resources include a Physical D2D Synchronization Channel (PD2DSCH).

In accordance with a second example embodiment of the present invention, a method for operating a mobile device is provided. The method includes transmitting, by the mobile device over grouped communications resources, a first instance of a data structure for D2D signaling. The data structure includes a first data field that indicates at least one of a D2D frame number, a D2D multiplexing configuration, a resource allocation for D2D signaling, an identifier of a D2D synchronization source, a type of a D2D synchronization source, or whether the mobile device is in coverage of a network. The data structure also includes a second data field indicating at least one of whether a D2D signaling operation is prohibited, or a type of prohibited D2D signaling operation.

Also, the foregoing second example embodiment may be implemented to include one or more of the following additional features. The method may also be implemented to further include receiving, by the mobile device, a second instance of the data structure for D2D signaling. In such an implementation, when the second instance of the data structure indicates that a D2D operation is prohibited for a class of prohibited devices that includes the mobile device, the method may further include adapting, by the mobile device, a configuration of the mobile device to prevent the prohibited D2D operation, such that the class of prohibited devices includes either all mobile devices, mobile devices that are associated with a prohibited operator, or out-of-coverage mobile devices.

The method may also be implemented to further include detecting, by the mobile device, an attempted D2D signaling operation by a member of a first class of mobile devices. In such an implementation, the method may further include transmitting, by the mobile device, either a report to a base station of the attempted D2D signaling operation, or a second instance of the data structure for D2D signaling, where the second instance indicates that the attempted D2D signaling operation is prohibited for the first class of mobile devices.

The method may also be implemented such that the grouped communications resources include, essentially, at least one of a same time interval, a same frequency range, adjacent time intervals, adjacent frequency ranges, a same channel coding, a portion of a same resource block for SC-FDMA, or a portion of a same block for pseudo-random scrambling. The method may also be implemented such that the first instance of the data structure indicates at least one of a prohibition of a D2D transmission of user data, a prohibition of a D2D discovery operation, a prohibition of a D2D signaling operation using resources that are allocated by a mobile device, a prohibition of a D2D signaling operation for a class of prohibited mobile devices, or a prohibition of a D2D signaling operation for a class of prohibited mobile device users. The method may also be implemented such that the first instance of the data structure indicates the prohibition of the D2D signaling operation for the class of prohibited mobile device users, and the class of prohibited mobile device users does not include at least one of emergency services users or governmental users. The method may also be implemented to further include transmitting a synchronization training signal that is associated with the first instance of the data structure.

The method may also be implemented such that the grouped communications resources include a PD2DSCH. In such an implementation, the transmitting the synchronization signal may further include transmitting the synchronization training signal over a frequency range that overlaps with a frequency range of the grouped communications resources, and the synchronization training signal may include at least one of a Zadoff-Chu sequence or a maximum length sequence.

In accordance with a third example embodiment of the present invention, a base station is provided. The base station includes a processor and a non-transitory computer readable storage medium coupled to the processor and storing programming for execution by the processor. The programming includes instructions for directing a mobile device to transmit, over grouped communications resources, a first instance of a data structure for D2D signaling. The data structure includes a first data field that indicates at least one of a D2D frame number, a D2D multiplexing configuration, a resource allocation for D2D signaling, an identifier of a D2D synchronization source, a type of a D2D synchronization source, or whether the mobile device is in coverage of a network. The data structure also includes a second data field indicating at least one of whether a D2D signaling operation is prohibited, or a type of prohibited D2D signaling operation.

Also, the foregoing third example embodiment may be implemented to include one or more of the following additional features. The base station may be implemented such that the grouped communications resources include at least one of a same time interval, a same frequency range, adjacent time intervals, adjacent frequency ranges, a same channel coding, a portion of a same resource block for SC-FDMA, or a portion of a same block for pseudo-random scrambling.

The base station may also be implemented such that the first instance of the data structure includes an instance of the first data field that includes either uninitialized data, or data indicating that the instance of the first data field should be ignored. In such an implementation, the data structure may also include an instance of the second data field indicating the type of prohibited D2D signaling operation, and the type of prohibited D2D signaling operation may include at least one of D2D transmissions of user data, D2D discovery operations, a D2D signaling operation using resources that are allocated by a mobile device, a D2D signaling operation by a class of prohibited mobile devices, or a D2D signaling operation by a class of prohibited mobile device users.

The base station may also be implemented such that the type of prohibited D2D signaling operation includes the D2D signaling operation by the class of prohibited mobile devices, and the class of prohibited mobile devices includes at least one of mobile devices that are associated with a prohibited operator, or out-of-coverage mobile devices. The base station may also be implemented such that the type of prohibited D2D signaling operation includes the D2D signaling operation by the class of prohibited mobile device users, and the class of prohibited mobile device users includes at least one of non-emergency users or non-governmental users.

The base station may also be implemented such that the programming further includes instructions for receiving a report to include either network interference by a D2D signaling operation or potential network interference by a D2D signaling operation. In such an implementation, the programming may further include transmitting, over a downlink control channel, a message that includes a directive for the mobile device to transmit the first instance of the data structure for D2D signaling. In such an implementation, the message may also include a directive for the mobile device to transmit a synchronization training signal that is associated with the first instance of the data structure, and the first instance of the data structure may indicate that a D2D signaling operation is prohibited.

The base station may also be implemented such that the synchronization training signal includes at least one of a Zadoff-Chu sequence or a maximum length sequence. In such an implementation, the grouped communications resources may include a PD2DSCH.

In accordance with a fourth example embodiment of the present invention, a mobile device is provided. The mobile device includes a processor and a non-transitory computer readable storage medium coupled to the processor and storing programming for execution by the processor. The programming includes instructions for transmitting over grouped communications resources, a first instance of a data structure for D2D signaling. The data structure indicates at least one of a D2D frame number, a D2D multiplexing configuration, a resource allocation for D2D signaling, an identifier of a D2D synchronization source, a type of a D2D synchronization source, or whether the mobile device is in coverage of a network. The programming also includes instructions for receiving a second instance of the data structure. The programming also includes instructions for adapting a configuration of the mobile device to prevent the prohibited D2D operation when the second instance of the data structure indicates that a D2D operation is prohibited for a class of prohibited devices that includes the mobile device.

Also, the foregoing fourth example embodiment may be implemented to include one or more of the following additional features. The mobile device may be implemented such that the class of prohibited devices includes either all mobile devices, mobile devices that are associated with a prohibited operator, or out-of-coverage mobile devices. The mobile device may also be implemented such that the grouped communications resources include, essentially, at least one of a same time interval, a same frequency range, adjacent time intervals, adjacent frequency ranges, a same channel coding, a portion of a same resource block for SC-FDMA, or a portion of a same block for pseudo-random scrambling.

The mobile device may also be implemented such that the first instance indicates at least one of a prohibition of a D2D transmission of user data, a prohibition of a D2D discovery operation, a prohibition of a D2D signaling operation using resources that are allocated by a mobile device, a prohibition of a D2D signaling operation for a class of prohibited mobile devices, or a prohibition of a D2D signaling operation for a class of prohibited mobile device users. The mobile device may also be implemented such that the first instance indicates the prohibition of the D2D signaling operation for the class of prohibited mobile device users, and the class of prohibited mobile device users excludes at least one of emergency services users, police users, and military users.

The mobile device may also be implemented such that the programming further includes instructions for transmitting a synchronization training signal that is associated with the first instance of the data structure. The mobile device may also be implemented such that the synchronization training signal includes at least one of a Zadoff-Chu sequence or a maximum length sequence, and the grouped communications resources include a PD2DSCH.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for operating a base station, comprising:
   instructing, by the base station, a mobile device to transmit over grouped communications resources, a first instance of a data structure for device-to-device (D2D) signaling, wherein the data structure comprises:
   a first data field for indicating at least one of a D2D frame number, a D2D multiplexing configuration, a resource allocation for D2D signaling, an identifier of a D2D synchronization source, a type of a D2D synchronization source, or whether the mobile device is in coverage of a network; and
   a second data field explicitly indicating at least one of:
   a mobile device type-specific D2D signaling operation is prohibited for mobile devices, or
   a type of mobile device type-specific D2D signaling operation is prohibited for mobile devices;
   the first instance of the data structure comprising:
   an instance of the first data field, consisting of one of:
   uninitialized data, or
   data indicating that the instance of the first data field should be ignored.

2. The method of claim 1, wherein the grouped communications resources comprise at least one of a same time interval, a same frequency range, adjacent time intervals, adjacent frequency ranges, a same channel coding, a portion of a same resource block for single-carrier frequency division multiple access (SC-FDMA), or a portion of a same block for pseudo-random scrambling.

3. The method of claim 1, wherein:
   an instance of the second data field indicating the type of mobile device D2D signaling operation is prohibited, the type of mobile device D2D signaling operation that is prohibited comprising at least one of D2D transmissions of user data, D2D discovery operations, the mobile device D2D signaling operation using resources that are allocated by a mobile device, the mobile device D2D signaling operation by a class of prohibited mobile devices, or the mobile device D2D signaling operation by a class of prohibited mobile device users.

4. The method of claim 3, wherein:
   the type of mobile device D2D signaling operation that is prohibited comprises the mobile device D2D signaling operation by the class of prohibited mobile devices, and
   the class of prohibited mobile devices comprises at least one of:
   mobile devices that are associated with a prohibited operator, or
   out-of-coverage mobile devices.

5. The method of claim 3, wherein:
   the type of mobile device D2D signaling operation that is prohibited comprises the mobile device D2D signaling operation by the class of prohibited mobile device users, and
   the class of prohibited mobile device users comprises at least one of non-emergency users or non-governmental users.

6. The method of claim 1, further comprising receiving, by the base station, a report comprising one of network interference by the mobile device D2D signaling operation or potential network interference by the mobile device D2D signaling operation, wherein:
   the first instance of the data structure indicates that the mobile device D2D signaling operation is prohibited; and
   the instructing the mobile device to transmit the first instance of the data structure for D2D signaling comprises transmitting, by the base station over a downlink control channel, a message comprising:
an instruction for the mobile device to transmit the first instance of the data structure for D2D signaling; and
an instruction for the mobile device to transmit a synchronization training signal that is associated with the first instance of the data structure.

7. The method of claim 6, wherein:
the synchronization training signal comprises at least one of a Zadoff-Chu sequence or a maximum length sequence, and
the grouped communications resources comprise a Physical D2D Synchronization Channel (PD2DSCH).

8. A method for operating a mobile device, comprising:
transmitting, by the mobile device overgrouped communications resources, a first instance of a data structure for device-to-device (D2D) signaling, wherein the data structure comprises:
a first data field that indicates at least one of a D2D frame number, a D2D multiplexing configuration, a resource allocation for D2D signaling, an identifierof a D2D synchronization source, a type of a D2D synchronization source, or whetherthe mobile device is in coverage of a network; and
a second data field explicitly indicating at least one of:
a mobile device type-specific D2D signaling operation is prohibited for mobile devices, or
a type of mobile device type-specific D2D signaling operation is prohibited for mobile devices;
the first instance of the data structure comprising:
an instance of the first data field, consisting of one of:
uninitialized data, or
data indicating that the instance of the first data field should be ignored.

9. The method of claim 8, further comprising:
receiving, by the mobile device, a second instance of the data structure for D2D signaling; and
in response to the second instance of the data structure indicating that a D2D operation is prohibited for a class of prohibited devices that comprises the mobile device, adapting, by the mobile device, a configuration of the mobile device to prevent the D2D operation that is prohibited,
wherein the class of prohibited devices comprises one of:
all mobile devices,
mobile devices that are associated with a prohibited operator, or
out-of-coverage mobile devices.

10. The method of claim 8, further comprising:
detecting, by the mobile device, an attempted mobile device D2D signaling operation by a member of a first class of mobile devices; and
transmitting, by the mobile device, one of:
a report to a base station of the attempted mobile device D2D signaling operation, or
a second instance of the data structure for D2D signaling, wherein the second instance indicates that the attempted mobile device D2D signaling operation is prohibited for the first class of mobile devices.

11. The method of claim 8, wherein the grouped communications resources comprise at least one of a same time interval, a same frequency range, adjacent time intervals, adjacent frequency ranges, a same channel coding, a portion of a same resource block for single-carrier frequency division multiple access (SC-FDMA), or a portion of a same block for pseudo-random scrambling.

12. The method of claim 8, wherein the first instance of the data structure indicates at least one of a prohibition of mobile device euD2D transmission of user data, a prohibition of a D2D discovery operation, a prohibition of the mobile device D2D signaling operation using resources that are allocated by a mobile device, a prohibition of the mobile device D2D signaling operation for a class of prohibited mobile devices, or a prohibition of the mobile device D2D signaling operation for a class of prohibited mobile device users.

13. The method of claim 12, wherein:
the first instance of the data structure indicates the prohibition of the mobile device D2D signaling operation for the class of prohibited mobile device users, and
the class of prohibited mobile device users does not include at least one of emergency services users or governmental users.

14. The method of claim 8, further comprising:
transmitting a synchronization training signal that is associated with the first instance of the data structure.

15. The method of claim 14, wherein:
the grouped communications resources comprise a Physical D2D Synchronization Channel (PD2DSCH);
the transmitting the synchronization training signal further comprises transmitting the synchronization training signal over a frequency range that overlaps with a frequency range of the grouped communications resources; and
the synchronization training signal comprises at least one of a Zadoff-Chu sequence or a maximum length sequence.

16. A base station comprising:
a processor; and
a non-transitory computer readable storage medium coupled to the processor and storing programming for execution by the processor, the programming including instructions for:
directing, by the base station, a mobile device to transmit over grouped communications resources, a first instance of a data structure for device-to-device (D2D) signaling, wherein the data structure comprises:
a first data field for indicating at least one of a D2D frame number, a D2D multiplexing configuration, a resource allocation for D2D signaling, an identifier of a D2D synchronization source, a type of a D2D synchronization source, or whetherthe mobile device is in coverage of a network; and
a second data field explicitly indicating at least one of:
a mobile device type-specific D2D signaling operation is prohibited for mobile devices, or
a type of mobile device type-specific D2D signaling operation is prohibited for mobile devices;
wherein the first instance of the data structure comprises:
an instance of the first data field, consisting of one of:
uninitialized data, or
data indicating that the instance of the first data field should be ignored.

17. The base station of claim 16, wherein the grouped communications resources comprise at least one of a same time interval, a same frequency range, adjacent time intervals, adjacent frequency ranges, a same channel coding, a portion of a same resource block for single-carrier frequency division multiple access (SC-FDMA), or a portion of a same block for pseudo-random scrambling.

18. The base station of claim 16, wherein:
an instance of the second data field indicating the type of mobile device D2D signaling operation is prohibited, the type of mobile device D2D signaling operation that is prohibited comprising at least one of D2D transmissions of user data, D2D discovery operations, mobile device D2D signaling operation using resources that are allocated by a mobile device, mobile device D2D signaling operation by a class of prohibited mobile devices, or mobile device D2D signaling operation by a class of prohibited mobile device users.

19. The base station of claim 18, wherein:
the type of mobile device D2D signaling operation that is prohibited comprises the mobile device D2D signaling operation by the class of prohibited mobile devices, and
the class of prohibited mobile devices comprises at least one of:
  mobile devices that are associated with a prohibited operator, or
  out-of-coverage mobile devices.

20. The base station of claim 18, wherein:
the type of mobile device D2D signaling operation that is prohibited comprises the mobile device D2D signaling operation by the class of prohibited mobile device users, and
the class of prohibited mobile device users comprises at least one of non-emergency users or non-governmental users.

21. The base station of claim 16, wherein:
the programming further comprises instructions for:
  receiving a report comprising one of network interference by the mobile device D2D signaling operation or potential network interference by the mobile device D2D signaling operation;
  transmitting, over a downlink control channel, a message comprising:
    a directive for the mobile device to transmit the first instance of the data structure for D2D signaling; and
    a directive for the mobile device to transmit a synchronization training signal that is associated with the first instance of the data structure; and
the first instance of the data structure indicates that the mobile device D2D signaling operation is prohibited.

22. The base station of claim 21, wherein:
the synchronization training signal comprises at least one of a Zadoff-Chu sequence or a maximum length sequence, and
the grouped communications resources comprise a Physical D2D Synchronization Channel (PD2DSCH).

23. A mobile device comprising:
a processor; and
a non-transitory computer readable storage medium coupled to the processor and storing programming for execution by the processor, the programming including instructions for:
  transmitting, by the mobile device, over grouped communications resources, a first instance of a data structure for device-to-device (D2D) signaling,
  wherein the data structure indicates at least one of a D2D frame number, a D2D multiplexing configuration, a resource allocation for D2D signaling, an identifier of a D2D synchronization source, a type of a D2D synchronization source, or whether the mobile device is in coverage of a network, and
  wherein the data structure further explicitly indicates at least one of a mobile device type-specific D2D signaling operation is prohibited for mobile devices, or a type of mobile device type-specific D2D signaling operation is prohibited for mobile devices;
  receiving a second instance of the data structure; and
  in response to the second instance of the data structure indicating that a mobile device D2D operation is prohibited for a class of prohibited devices that comprises the mobile device, adapting a configuration of the mobile device to prevent the mobile device D2D operation that is prohibited;
wherein the first instance of the data structure comprises:
  an instance of a first data field, consisting of one of:
    uninitialized data, or
    data indicating that the instance of the first data field should be ignored.

24. The mobile device of claim 23, wherein
the class of prohibited devices comprises one of all mobile devices, mobile devices that are associated with a prohibited operator, or out-of-coverage mobile devices.

25. The mobile device of claim 23, wherein the grouped communications resources comprise at least one of a same time interval, a same frequency range, adjacent time intervals, adjacent frequency ranges, a same channel coding, a portion of a same resource block for single-carrier frequency division multiple access (SC-FDMA), or a portion of a same block for pseudo-random scrambling.

26. The mobile device of claim 23, wherein the first instance indicates at least one of a prohibition of a D2D transmission of user data, a prohibition of a D2D discovery operation, a prohibition of the mobile device D2D signaling operation using resources that are allocated by a mobile device, a prohibition of the mobile device D2D signaling operation for a class of prohibited mobile devices, or a prohibition of the mobile device D2D signaling operation for a class of prohibited mobile device users.

27. The mobile device of claim 26, wherein:
the first instance indicates the prohibition of the mobile device D2D signaling operation for the class of prohibited mobile device users, and
the class of prohibited mobile device users excludes at least one of emergency services users, police users, and military users.

28. The mobile device of claim 23, wherein the programming further comprises instructions for transmitting a synchronization training signal that is associated with the first instance of the data structure.

29. The mobile device of claim 28, wherein:
the synchronization training signal comprises at least one of a Zadoff-Chu sequence or a maximum length sequence, and
the grouped communications resources comprise a Physical D2D Synchronization Channel (PD2DSCH).

* * * * *